May 11, 1965 E. F. HISCOCK 3,183,096

COFFEE PACKET AND SYNTHETIC FILTER PAPER UTILIZED THEREIN

Filed June 6, 1962 2 Sheets-Sheet 1

INVENTOR
Earle F. Hiscock
BY Rommel, Allen & Rommel
ATTORNEYS

COFFEE PACKET AND SYNTHETIC FILTER PAPER UTILIZED THEREIN

Filed June 6, 1962

INVENTOR
Earle F. Hiscock

BY Rommel, Allwine & Rommel
ATTORNEYS 3,183,096
Patented May 11, 1965

3,183,096

COFFEE PACKET AND SYNTHETIC FILTER PAPER UTILIZED THEREIN

Earle F. Hiscock, Chatham, Mass., assignor to Kip, Inc., Chatham, Mass., a corporation of Delaware Filed June 6, 1962, Ser. No. 201,727
7 Claims. (Cl. 99—77.1)

The present application constitutes a continuation-in-part of applications filed in the United States, Serial No. 20,379, filed April 6, 1960 (now abandoned), and Serial No. 39,178, filed June 27, 1960 (now abandoned).

This invention relates to improvements in the art of brewing coffee through the use of a porous packet made from a synthetic fiber paper which is pure and taste free and which will not remove the delicate aroma and flavor of good coffee. It further relates to the discovery of materials which will not cause a catalytic degradation of the delicate aroma and flavor characteristics of fresh coffee when the coffee is stored for long periods in the packet and thus in intimate contact with the paper material.

Many inventors, including myself, have for the past ten or twenty years attempted to invent and develop a coffee brewing bag that would brew good coffee and would, at the same time, meet the food requirements necessary for any product used for human consumption. Some of these prior patents are:

2,277,050, R. E. Reed et al., March 24, 1942
2,786,761, M. Weisman, March 26, 1957
2,531,594, L. H. Abrahams, November 28, 1950
2,838,400, V. C. Wardell, June 10, 1958

The inventors of these patents for producing fabrics or papers which were suitable for tea bags have concluded erroneously that the materials would likewise be suitable for a coffee brewing bag. I invented a woven rayon bag covered by U.S. Patent No. 2,824,002. This bag did survive market tests. It was not successful and failed because of its prohibitively high cost and the slowness of permeation when used outside of a special machine for which it had been specially developed.

The primary object of this invention is the provision of a disposable coffee unit including a packet receiving comminuted coffee, which is formed of suitable porous material chemically inert as to taste so that the brew has none of the natural coffee taste and aroma blanked out. This packet is adapted for use without any special brewing apparatus such as vacuum filters. The brewing packet is adapted for use in any vessel of hot water and, after brewing, may be disposed of as a unit.

The preferred method for brewing coffee with my invention is to bring the water to a boil in any covered pot, percolator, or bottom part of a glass coffee maker. When the water has come to a boil, the heat is turned off and the coffee packet containing the comminuted coffee is dropped into the boiling water. The cover is replaced and the pot is allowed to stand for approximately four to six minutes. For best results, the coffee packet should be stirred with a large spoon three or four times during this period or otherwise mechanically agitated. At the end of the four to six minutes the packet is removed and thrown away.

There are many reasons why no one has to date been able to produce a satisfactory, commercially acceptable, coffee brewing bag. It seems strange that, in an industry where tea bags have become the standard method of packaging tea, no one has been able to produce commercially a coffee bag similar in type. I have discovered that none of the materials which have been invented or which are currently used for tea bags will make a satisfactory coffee brewing packet.

In many cases the tea bag material imparts a taste and odor which will affect the delicate flavor of coffee. The amount of paper used for tea bags is much less in relation to the volume of tea than is the case with a coffee brewing packet, so a material which could be used for tea might be completely unsuitable for coffee. In addition, as it is commonly stated, tea is steeped and coffee is brewed. This terminology differentiates between a short immersion at temperatures of around 170° to 180° F. for tea as opposed to a four to six minute brew at temperatures around 200° to 210° F. for brewing strong, full flavored coffee.

Another reason for previous failures is that the composition of coffee is so complex that many inventors operating in this field have not realized the full scope of the problem. They have not realized that many materials would cause catalytic degradation of some of the constituents which comprise the aroma of coffee. The full composition of coffee is not yet known even though many eminent organic chemists have attempted to analyze and isolate the constituents. However, volatiles which have been isolated in fresh ground coffee include hydrogen sulfide, isoprene, methyl mercaptan, acetaldehyde, dimethyl sulfide, methyl formate, furan, propionaldehyde, isobutyraldehyde, acetone, methyl furan, butyraldehyde, methyl ethyl ketone, isovaleraldehyde, methyl alcohol, diacetyl, ethyl alcohol, and acetyl propionyl. Coffee aroma is the result of a complex mixture and no one knows which components contribute to the aroma. If some ingredients are either selectively absorbed or adsorbed or if certain ingredients are polymerized or catalytically decomposed, the elimination of this constituent will affect the true flavor and aroma of the coffee.

A further problem in the packaging of coffee in a brewable coffee packet lies in the well known behavior of oxygen in deteriorating these complex constituents of coffee. But what previous inventors had not discovered was that the substances from which they made their tea bags and then attempted to use for coffee bags would contribute and accelerate the deterioration of coffee packed therein through acting as oxygen carriers. I have discovered that certain monofilaments of synthetic fibers when combined in a fashion which will make a suitable strong permeable membrane and which will not contain objectionable constituents will produce a coffee brewing bag that does not damage the natural aroma and flavor of coffee and does not impart any false flavor or taste or odor. In addition, since the bags must be very large as explained in my Patent No. 2,824,002, it is particularly important that the paper be made of such purity that it will not contribute harmful ingredients to the health of the coffee drinker and that it will pass the extremely stringent present requirements imposed by the Food and Drug Administration of the U.S. Government.

I have heretofore used woven nylon for the purpose of packaging comminuted coffee. Such woven nylon is inert to taste. Because of costs, weight and porosity factors, I have discovered that a greatly superior coffee packet can be provided for brewing use, fabricated of synthetic filaments or fibers of a definite range of thicknesses, which can be matted and fabricated into a paper having a definite range of thicknesses such as will give better porosity for brewing purposes than woven nylon. It is, therefore, proposed to provide packets of this improved synthetic fiber paper heat sealed in order to provide a chamber for receiving the comminuted coffee and which packet has an appreciably higher melting or fusing point than the temperatures necessary to prepare the desired brew of the coffee contained in the packet.

A further object of the invention is the provision of an improved method for producing synthetic fiber paper of desirable polyamide, polyester, acrylic, and/or olefine single fiber filaments which are arranged heterogeneously and fused together so as to produce a thin paper of high tensile strength and with that degree of flexibility and porosity which will enable its use in the fabrication of packets for receiving comminuted coffee.

Other objects and advantages of this invention will be apparent during the course of the following detailed description.

In the drawings, wherein for the purpose of illustration are shown various means and ways of forming the synthetic paper packet:

Figure 1:
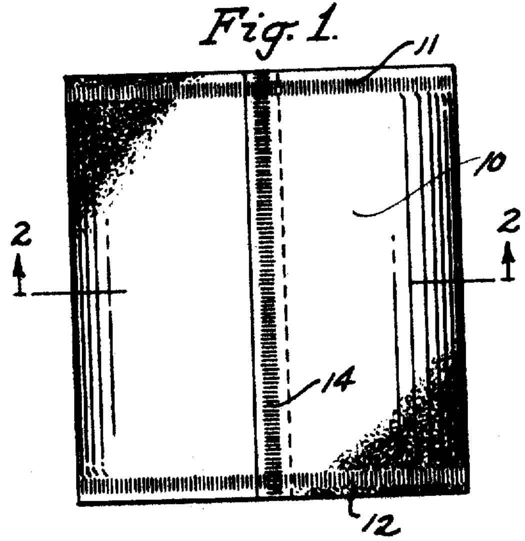
FIGURE 1 is an elevation view showing the packet. It is heat sealed along such marginal lines as are necessary to close the packet.
Figure 2:
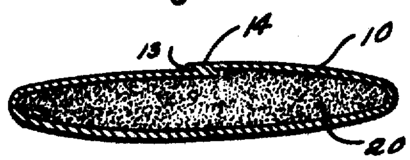
FIGURE 2 is a cross sectional view taken substantially on the line 2—2 of FIGURE 1; the cross sectional view showing the synthetic paper and the coffee therein as it would appear in cross section with the packet lying flat or horizontal.
Figure 4:
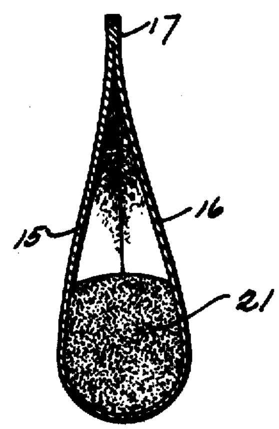
FIGURE 4 is a vertical cross sectional view taken substantially on the line 4—4 of FIGURE 3, assuming that the packet is suspended from its upper marginal edge.

Referring to FIGURE 1, the synthetic paper designated at 10 is packaged upon a machine which heat seals a narrow band marginally at the top edge 11 and a narrow band marginally at the bottom edge 12; the paper being overlapped centrally along the packet at 13 and fused or heat sealed at 14 in a narrow band.

Figure 3:
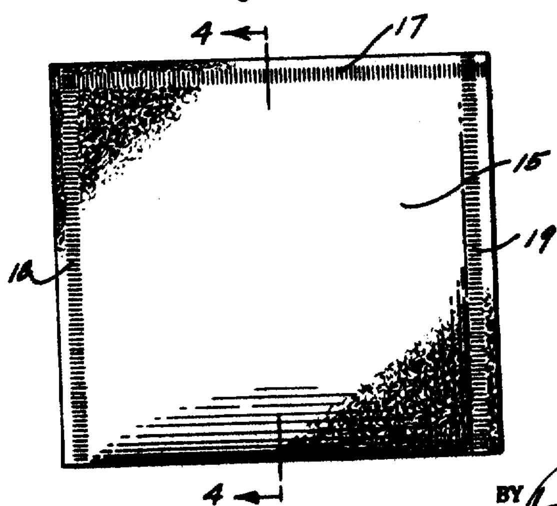
FIGURE 3 is a cross sectional view of another form of heat sealed packet.

In the form of packet shown in FIGURE 3, the material of the packet is doubled upon itself to provide walls 15 and 16, the upper marginal edges of which are heat sealed at 17 and the side edges of which are heat sealed at 18 and 19.

The packets shown in FIGURES 1 and 3 are adapted to receive coffee, designated at 20 and 21 respectively.

Figure 5:
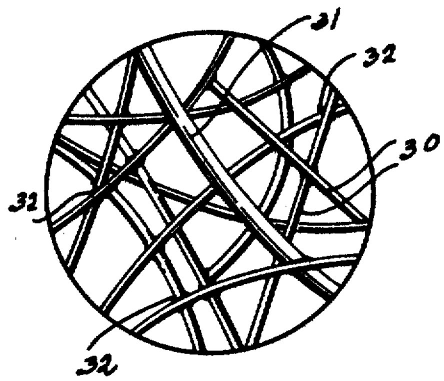
FIGURE 5 is a 385× magnification of the single filament fibers in synthetic paper form of a weight of 0.5 ounce per square yard. In this type of paper, the fibers are hot fused.

In FIGURE 5, the fibers 30 are arranged heterogeneously; some of the fibers as shown at 31 being filaments of larger diameter than others, although this may be departed from if found necessary. Under hot fusing, they are bonded together where they cross, at 32.

Figure 6:
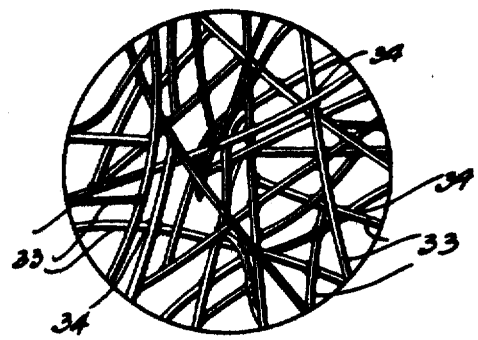
FIGURE 6 is a 385× magnification of single filament fibers in synthetic paper form weighing 0.5 ounce per square yard after fabrication; the fibers in such case being hot calendered.

The hot calendered formed fibers 33 shown in the 0.5 ounce per square yard magnification of FIGURE 6 are similarly heterogeneously arranged; the fibers being more firmly compressed than with hot fusing and bonded together at 34. The filaments 33 are single filaments and not multiple filaments and they may be of various sizes.

Figure 7:
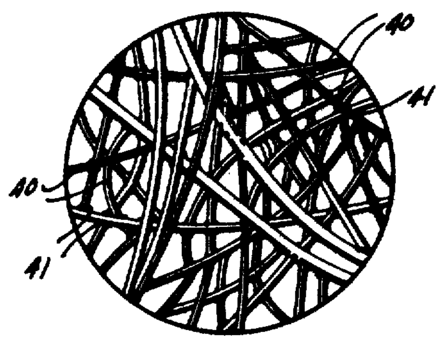
FIGURE 7 shows a 385× magnification of synthetic paper formed of synthetic single filament fibers, and which paper after fabrication weighs 0.75 ounce per square yard; the fibers being bonded by hot calendering.

It will be noted that the hot calendered synthetic paper of FIGURE 7, which is of the weight of 0.75 ounce per square yard comprises filaments 40 which are bonded together by light hot calendering at 41 where they cross each other.

Figure 8:
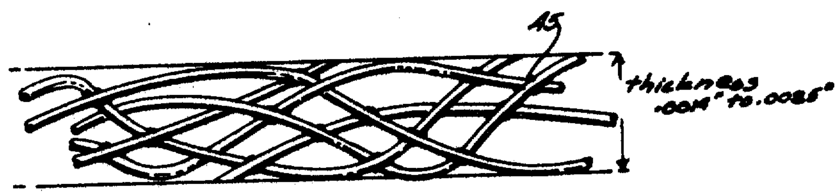
FIGURE 8 is a vertical cross sectional view taken through a thickness of the finished synetheic paper formed of "Dacron" (polyester) or nylon showing the filaments arranged substantially four deep in a mat which is approximately .002 inch in thickness.

In the extra large magnification of FIGURE 8, which may be a section through any suitable synthetic fibers in paper form; the thickness of the paper may range from .0014 of an inch to .0025 of an inch and the fusion points of the fibers where they cross is indicated at 45. It would be noted that the fibers generally are formed in a mat four or five fibers deep.

The melting point of synethetic paper formed of nylon is about 488° F. and that of the "Dacron" paper about 480° F. These temperatures which are high sharp melting points are far above the temperatures necessary to brew coffee. I may also use any polymeric fibers having similar and generally equal taste inert and neutral qualities as well as sharp high melting points, together with sufficient stability at melting to allow fusion of the fibers into a web like matrix and to produce a neutral and strong sufficiently porous membrane. Among such fibers which may be used are the polyamides, such as the various nylons, and polyesters, such as "Terylene" and "Dacron." Such fibers, to be suitable for the synthetic paper must of necessity have a melting point sufficiently high to be well above the boiling point of water and must be neutral and inert to taste and acceptable for brewing and steeping coffee.

"Dacron" and "Terylene" are highly polymeric linear terephthalic esters composed of recurring structural units of the formula

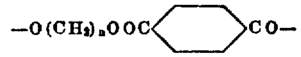

$$-O(CH_2)_nOOC\langle\ \rangle CO-$$

wherein *n* represents an integer within the range of 2 to 10, the three lowest members of the series having melting points above 200° C.

In order to secure a desired thickness of synthetic paper, and the desired porosity suitable for the purposes designated, the fiber filaments may have individual diameters of from .00025 of an inch to .0003 of an inch with average optimum thickness of the fabricated paper of .0015 inch. The fibers are criss-crossed and arranged in such manner as to not be piled more than four to five deep.

The average size of the openings forming the interstices of the finished synthetic paper are on the order of .003 inch to .008 inch and this is true for synthetic paper weighing 0.5 ounce per square yard. In synthetic paper weighing 0.75 of an ounce per square yard, the openings will be on the order of not over .005 of an inch and there will be fewer of them per square inch than the openings of 0.5 ounce paper.

The paper can be made upon conventional paper making machines except that the heat necessary to fuse the filaments for the nylons must be about 488° F.; for "Dacron" about 480° F.; for "Terylene" about 500° F. It is new to produce a synthetic paper of nylon or "Dacron" single filaments fused together as above described for the purpose of producing a thin fabric capable of serving the purposes of packet use for the brewing of coffee. It has been found that if the single filaments of the types above specified synthetic fibers are blown into a large mixing chamber and kept in agitation by an air stream of adjusted velocity to keep the filaments aloft, a good orientation of the filaments, one across the other in properly intermingled relation and uniformally, can be obtained to provide the desired porosity. A synthetic paper felt or mat of the filaments can be drawn down by air suction and passed onto the screen of a Fourdrinier paper making machine. In any event, the mat obtained can be fused by oven treatment alone or hot calendered if it is desired to give the synthetic paper a smooth finish. Nylon and "Dacron" paper of the order of 0.75 ounce per square yard has a Mullen bursting strength of substantially 40 pounds per square inch for the 0.5 paper and 48 pounds for the 0.75 paper. By fusing the synthetic filaments at the temperatures designated, I have provided a screen mesh type of grid which is extremely thin and of such permeability that water flow is far higher through the paper thickness than with woven material heretofore used for the same purposes.

A synthetic fiber paper can also be made from synthetic fibers selected from the class of nylons, polyesters, polyacrylics and viscose rayons combined with dispersed polymeric binders. In this process, the fibers are beaten together with the dispersed polymer and are then cast on the Fourdrinier screen of a paper making machine. The soft pulp paper is then dried on drying rolls and calendered at temperatures which melt the polymeric binder particles and cause them to seal together and bind the relatively long synthetic fibers. In the following example the synthetic fiber porous paper has been made by this process using Dacron (polyester) fibers of 1.5 deniers in thickness and ¼ inch in length. The polymeric binder is a medium molecular weight copolymer of vinyl chloride and vinyl acetate with approximately 87 percent vinyl chloride and approximately 13 percent vinyl acetate. This copolymer has a melting or softening point of approximately 375° F. which is substantially lower than the melting point of the Dacron polyester. Thus, during the calendering operation the polymer fuses to bind or weld the relatively long fibers together to form very strong open mesh and uniform textured porous permeable paper. This permeability is clearly illustrated in the example in which it has been compared with the preferred woven viscose rayon which was described in my Patent No. 2,824,002.

WATER FLOW RATE AT LOW PRESSURE

[Rate of flow at 1" water pressure]

| | |
|---|---|
| Woven Viscose Rayon 2.5 oz. per sq. yd. (As disclosed in U.S. Patent 2,824,002). | 6 cu. cm. per sq. in. per second. |
| Unwoven Synthetic Fiber Paper 0.75 oz. per sq. yd. ("Dacron" bonded with Vinylite). | 32 cu. cm. per sq. in. per second. |

MULLEN BURST STRENGTHS

[Pounds per square inch]

| | Dry | Wet 5 min. in water at 70° F. | Boiled 5 min. in water at 212° F. |
|---|---|---|---|
| Woven Viscose Rayon 2.5 oz. per sq. yd. (As disclosed in U.S. Patent 2,824,002) | 138 | 72 | 76 |
| Unwoven Synthetic Fiber Paper 0.75 oz. per sq. yd. ("Dacron" bonded with Vinylite) | 18 | 11 | 11 |

The permeable synthetic fiber paper used in the above example will permit rapid brewing of full strength, full bodied coffee. At the same time, its permeability is such that it limits the amount of coffee fines which carry through and which if present in too great a quantity are objectionable and referred to as "coffee mud."

It should be borne in mind that it is a purpose of this invention to provide a reasonably priced synthetic paper which is very strong and absolutely pure in taste with such porosity as will enable liquids to filter therethrough with ease for quickly enabling the brewing of coffee contained in the packet.

It has been found that the degree of looseness of initial packing of the coffee in the sack has a great deal to do with proper circulation of water in and through the food product, having in mind proper filtering within brewing time. In connection with the use of comminuted coffee in which the coffee particles are of a size less than 0.01 inch, I have found that the volume of drip grind coffee of from 40% to 60% of the full volumetric capacity of the bag packet produces proper results with an optimum result obtained from comminuting the coffee and having it filled to one half of the volumetric capacity of the sack.

Various changes in the size, shape and arrangement of parts may be made to the invention as herein shown and described, and in and to the method of producing the paper and its packet without departing from the spirit of the invention or scope of the claims.

I claim:

1. A taste free coffee packet for the brewing of coffee comprising a porous synthetic fiber paper flexible sack of single filament polymeric fibers selected from a group consisting of nylons, polyesters, and acrylics bonded together by a taste free non-toxic dispersed polymer having a melting point in excess of the boiling point of water and substantially lower than the melting point of the polymeric fibers which it bonds, the paper of the packet having the packet edges heat sealed at a temperature above the melting point of the dispersed binding polymer and below the melting point of the polymeric fibers whereby the strength and flexibility of the fibers remain unchanged during the heat sealing operation, said paper having a thickness in the range of between about 0.0014 and about 0.0025 of an inch; a Mullen burst strength while wet of at least about 11 pounds per square inch after being boiled for five minutes; a flow rate in excess of 5 cubic centimeters per square inch per second at 1 inch water pressure and an average pore size between about 0.003 and about 0.008 of an inch, and comminuted coffee in said packet.

2. The coffee packet claimed in claim 1 in which the polymeric binder particles comprise a copolymer of approximately 87% vinyl chloride and approximately 13% vinyl acetate.

3. A taste free coffee packet for the brewing of coffee comprising a porous synthetic fiber paper flexible sack of single filament nylon fibers bonded together by a taste free non-toxic dispersed polymer having a melting point in excess of the boiling point of water and substantially lower than the melting point of the nylon fibers which it bonds, the paper of the packet having the packet edges heat sealed at a temperature above the melting point of the dispersed binding polymer and below the melting point of the nylon fibers whereby the strength and flexibility of the fibers remain unchanged during the heat sealing operation; said paper having a thickness in the range of between about 0.0014 and about 0.0025 of an inch; a Mullen burst strength while wet of at least about 11 pounds per square inch after being boiled for five minutes; a flow rate in excess of 5 cubic centimeters per square inch per second at 1 inch water pressure and an average pore size between about 0.003 and about 0.008 of an inch, and comminuted coffee in said packet.

4. A taste free coffee packet for the brewing of coffee comprising a porous synthetic fiber paper flexible sack of single filament polyester fibers bonded together by a taste free non-toxic dispersed polymer having a melting point in excess of the boiling point of water and substantially lower than the melting point of the polyester fibers which it bonds, the paper of the packet having the packet edges heat sealed at a temperature above the melting point of the dispersed binding polymer and below the melting point of the polyester fibers whereby the strength and flexibility of the fibers remain unchanged, during the heat sealing operation, said paper having a thickness in the range of between about 0.0014 and about 0.0025 of an inch; a Mullen burst strength while wet of at least about 11 pounds per square inch after being boiled for five minutes; a flow rate in excess of 5 cubic centimeters per square inch per second at 1 inch water pressure and an average pore size between about 0.003 and about 0.008 of an inch, and comminuted coffee in said packet.

5. A taste free coffee packet for the brewing of coffee comprising a porous synthetic fiber paper flexible sack of single filament acrylic fibers bonded together by a taste free non-toxic dispersed polymer having a melting point in excess of the boiling point of water and substantially lower than the melting point of the acrylic fibers which it bonds, the paper of the packet having the packet edges heat sealed at a temperature above the melting point of the dispersed binding polymer and below the melting point of the acrylic fibers whereby the strength and flexibility of the fibers remain unchanged, during the heat sealing operation, said paper having a thickness in the range of between about 0.0014 and about 0.0025 of an inch; a Mullen burst strength while wet of at least about 11 pounds per square inch after being boiled for five minutes; a flow rate in excess of 5 cubic centimeters per square inch per second at 1 inch water pressure and an average pore size between about 0.003 and about 0.008 of an inch, and comminuted coffee in said packet.

6. A synthetic fiber paper for making taste free coffee packets for the brewing of coffee comprising single filament polymeric fibers selected from a group consisting of nylons, polyesters and acrylics bonded together by a taste free non-toxic dispersed polymer having a melting point in excess of the boiling point of water and substantially lower than the melting point of the polymeric fibers which it bonds, said paper having a thickness in the range of between about 0.0014 and about 0.0025 of an inch; a Mullen burst strength while wet of at least about 11 pounds per square inch after being boiled for five minutes; a flow rate in excess of 5 cubic centimeters per square inch per second at 1 inch water pressure and an average port size between about 0.003 and about 0.008 of an inch.

7. The synthetic fiber paper claimed in claim 6 in which the polymeric binder particles comprise a copolymer of approximately 87% vinyl chloride and approximately 13% vinyl acetate.

References Cited by the Examiner

UNITED STATES PATENTS

| | | | |
|---|---|---|---|
| 2,277,050 | 3/42 | Reed et al. | 99—77.1 |
| 2,531,594 | 11/50 | Abrahams | 99—77.1 |
| 2,786,761 | 3/57 | Weisman | 99—77.1 |
| 2,824,002 | 2/58 | Hiscock | 99—77.1 |
| 2,838,400 | 6/58 | Wardell | 99—77.1 |

A. LOUIS MONACELL, *Primary Examiner.*

ABRAHAM H. WINKELSTEIN, *Examiner.*

UNITED STATES PATENT OFFICE

CERTIFICATE OF CORRECTION

Patent No. 3,183,096 May 11, 1965

Earle F. Hiscock

It is hereby certified that error appears in the above numbered patent requiring correction and that the said Letters Patent should read as corrected below.

Column 4, line 71, for "material" read -- materials --; column 8, line 1, for "port" read -- pore --.

Signed and sealed this 21st day of September 1965.

(SEAL)
Attest:

ERNEST W. SWIDER
Attesting Officer

EDWARD J. BRENNER
Commissioner of Patents